United States Patent Office 2,784,736
Patented Mar. 12, 1957

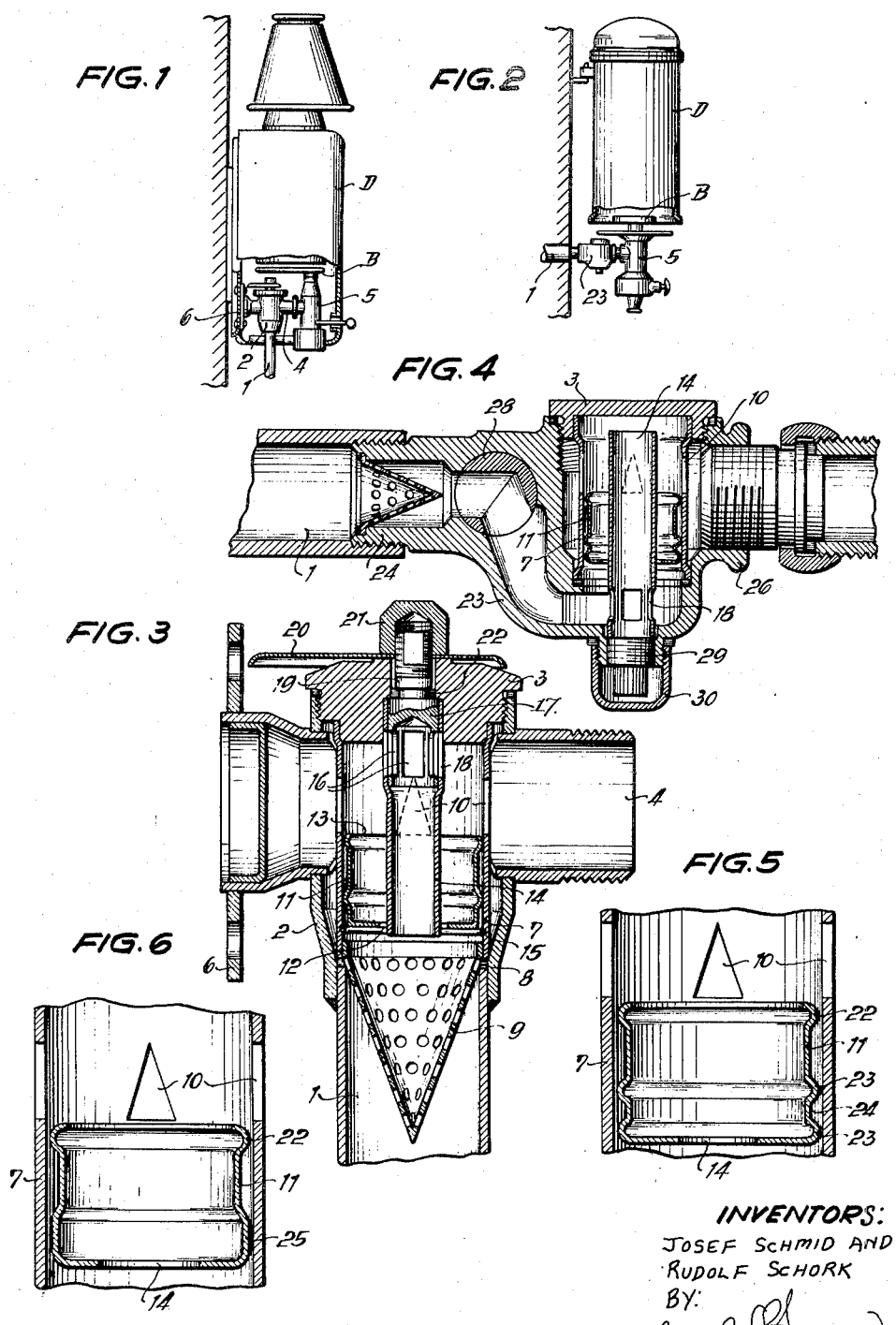
March 12, 1957    J. SCHMID ET AL    2,784,736
FLOW CONTROL DEVICE
Filed Dec. 18, 1953
INVENTORS:
JOSEF SCHMID AND
RUDOLF SCHORK
BY:

2,784,736
FLOW CONTROL DEVICE

Josef Schmid, Ludwigsburg, and Rudolf Schork, Stuttgart-Feuerbach, Germany, assignors to Firma Junkers & Co. G. m. b. H., Wernau am Neckar, Germany Application December 18, 1953, Serial No. 398,909

Claims priority, application Germany December 20, 1952

19 Claims. (Cl. 137—504)

The present invention relates to flow control devices, and more particularly to a flow control device adapted to be used with a flowing gaseous medium and utilizing a movable pressure-responsive control member for controlling the flow of the gaseous medium.

In known flow control devices of the above type, the different parts of the device are assembled individually in the control housing, and such arrangements render it difficult to disassemble the device for the purpose of cleaning and repairing it, since each of the parts must be taken out individually.

It is an object of the present invention to provide a flow control device which overcomes the above disadvantages.

It is another object of the present invention to provide an improved flow control device which operates automatically to control the amount of gas flowing through a conduit.

Other objects and advantages will become apparent from the following description and the appended claims.

With the above objects in view, the present invention mainly consists in a flow control device which includes conduit means having an inlet portion and an outlet portion for passage of a fluid medium therethrough, and a removable flow control unit arranged in the conduit means between the inlet and outlet portions thereof for controlling the flow of fluid medium therethrough, the unit comprising an insert means removably mounted in the conduit means and being formed with openings through which the inlet and outlet portions communicate, a control member movably mounted within the insert means movable by increase of pressure of the fluid medium in the inlet portion toward a position covering the openings in the insert means for reducing the flow of fluid medium therethrough and movable during reduction of pressure of the fluid medium in the inlet portion toward an open position uncovering the openings for increasing the flow of fluid medium therethrough, and a cover member forming a portion of the wall of the conduit means and being removably connected thereto, the cover member being secured to the insert means, whereby the flow control unit may be removed from the conduit means by removal of the cover member therefrom.

By virtue of the invention, the entire control arrangement is made easily removable from the conduit in which it is mounted and is easily replaceable in proper position without necessitating the removal and replacement of the parts thereof individually.

A further advantage of the present invention is that the sensitive movable or floating control member and the guide surfaces thereof are protected within the insert means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a side view of a gas water heater adapted to be equipped with a flow control device of the present invention;

Fig. 2 is a side view of a different type of gas water heater adapted to be equipped with a different embodiment of the present flow control device;

Fig. 3 is a longitudinal section of a flow control device incorporated in the arrangement shown in Fig. 1;

Fig. 4 is a longitudinal section through a flow control device incorporated in the arrangement shown in Fig. 2;

Fig. 5 is a longitudinal section through a floating control member adapted to be used in the embodiments shown in Figs. 3 and 4; and Fig. 6 is a longitudinal section of another embodiment of the floating control member.

Referring now to the drawings, and particularly to Figs. 1 and 3, there is shown one embodiment of the present invention wherein a tubular section 2 is arranged in fluid tight connection with the upper end of the gas inlet tube 1. At the joint between tubes 1 and 2 the tubes are tightly welded or soldered together. Tubular section 2 forms a housing for receiving the flow control device of the present invention, and at the upper end of tube section 2 a screw cap 3 is provided closing the open end of tube section 2. An outlet pipe 4 branches laterally off from tubular section 2 and is removably connected to the gas conduit of fitting 5 of the continuous heater device D.

Opposite the connecting pipe 4 the tubular section 2 carries a short closed pipe having a flange 6 which is adapted to be mounted on mounting frame (not shown) or on the wall to which the device is to be attached.

A tubular insert member 7 secured to the screw cap 3 extends into the tube section 2 with clearance therebetween, the lower end of insert member 7 being arranged to press with its lower end against sealing ring 8 which lies on the upper edge of gas inlet tube 1. At the lower end of insert member 7 a conical screen 9 is arranged with the base thereof inserted within the open end of insert member 7 and removably fastened thereto by resiliently pressing against the inner surface of insert member 7. The apex of screen 9 extends into gas inlet tube 1, and by virtue of the arrangement as shown in Fig. 3 the base portion of screen 9 serves to center sealing ring 8 in position between the opposing edges of insert member 7 and gas inlet tube 1.

Approximately at the height of the axis of outlet pipe 4, insert member 7 is provided with four triangular apertures 10 which are spaced at about 90° relative to each other. A piston- or cup-shaped floating control member 11 is slidably arranged within insert member 7, the bottom of floating member 11 being formed with a relatively large opening 12. Floating member 11 is slidable along the axis of insert member 7 so that, depending upon the height to which the upper edge 13 of member 11 extends in the various axial positions of member 11, member 11 closes openings 10 of insert member 7 to a greater or a lesser amount. A mounting ring 15, which may be a spring ring, is arranged in an annular groove at the lower end of insert member 7 and serves to keep floating member 11 from falling out of insert member 7.

In addition to carrying insert member 7, screw cap 3 also carries an inner tubular member 14 which extends coaxially with insert member 7 and projects with its open lower end through opening 12 in floating member 11, there being clearance provided between inner tubular member 14 and floating member 11 at the opening 12, as shown in Fig. 3. In the vicinity of its upper end, inner tubular member 14 is formed with apertures 18 through which the inlet pipe 1 may communicate with outlet pipe 4. An annular hollow slide valve 17 is rotatably mounted in inner tubular member 14 adjacent the apertures 18 therein, the annular slide valve 17 being formed with openings 16 similar to the apertures 18. By turning the valve 17 the openings 16 and 18 can be brought into positions wherein the openings are covered to a greater or lesser degree. The openings 16 and 18 are so dimensioned and arranged that their largest passage cross section is at least equal to the inner passage cross section of tubular member 14. The valve member 17 is connected to a pin 19 turnably mounted in screw cover 3 which extends outwardly of the screw cap 3 and is equipped at its outwardly projecting end with a hand lever 20. A cap nut 21 is provided for screwing hand lever 20 onto screw cap 3 and simultaneously to secure the pin 19 in screw cap 3.

The turnable pin 19 is provided with an annular groove in which a sealing ring 22 of rubber or the like is arranged, which provides a packing between pin 19 and the aperture in the screw cap 3, and at the same time prevents unintended turning of the valve member 17.

The above described flow control device operates as follows:

As soon as the gas inlet to burner B of water heater D is opened, gas may flow from inlet pipe 1 through the triangular openings 10 in insert member 7 into the outlet pipe 4 and from there through the fitting 5 to burner B in the following two ways:

Firstly, through tubular member 14 and openings 16 and 18. The gas volume flowing therethrough may be adjusted as desired by the adjustment of valve member 17.

Secondly, through the annular clearance space between tubular member 14 and the rim of opening 12 in the bottom of floating control member 11. This volume of gas is unchangeable.

Since in this way flowing gas strikes against the bottom of floating control member 11, member 11 is raised upwardly from its resting position to a greater or lesser degree. Consequently, the shell of control member 11 covers the triangular openings 10 to a greater or lesser extent, and in this way, when the gas pressure in the inlet portion 1 varies, the pressure of the gas which flows out through the uncovered portions of apertures 10, and thereby the quantity of gas delivered to the burner per unit of time, remains approximately the same.

In the embodiment shown in Figs. 2 and 4, the parts of the device corresponding to the parts of the previously described embodiment are indicated with the same reference numerals. This embodiment differs from the embodiment shown in Fig. 3 essentially in that the flow control device is not arranged in the gas conduit tube, but is arranged in a separate cast-metal housing 23 which is connected by means of connecting pipe 24 to the gas inlet pipe 1, and by means of connecting pipe 26 with the fitting 5 of the water heater D. The connecting pipe 24 is equipped with a gas valve 28.

A further difference between the embodiments is that the central tubular member 14 in the embodiment of Fig. 4 is not fastened to screw cap 3, but is connected to a threaded pin 29 which is threadedly mounted in the bottom of housing 23.

Openings 18 in inner tube member 14 are arranged in tube 14 nearer the gas inlet side thereof in the vicinity of the inner end of threaded pin 29. The upper open end of tube member 14 may be moved toward and away from the bottom of screw cap 3 by appropriate turning of threaded pin 29, whereby the gas quantity which flows through tube 14 to the triangular openings 10 can be varied as desired. This variation of the flow quantity serves in known manner for adjustment of the desired burner pressure. The outer end of threaded end 29 is covered by means of a removable closure cap 30.

Fig. 5 shows an embodiment wherein a particular form of floating member 11 is provided, and in this form member 11 has at its upper edge a raised bead-like guiding ring 22 which serves only as a lateral guide for the floating member 11, the diameter thereof being somewhat smaller than the guide bore formed by the tubular insert member 7. At the lower section of the floating member 11 there are provided two spaced, raised bead-like guide rings 23, between which the hollow annular chamber 24 is defined.

Fig. 6 shows another embodiment of the floating member 11 in which the lower portion of the floating member 11 is formed with a raised annular collar 25. The guide rings 23 as well as the annular collar surface 25 are arranged to provide such a slight clearance between themselves and the guide wall of insert member 7 that a flow friction is produced in the narrow guide clearance space during the axial movement of the floating member 11 in insert member 7, the thus-produced flow friction serving to damp the movements of the floating member. The arrangement of the device is such that the lower section of floating member 11 having the guide rings 23 or the annular collar 25 lies below the lowermost edge of openings 10 even in the uppermost operating position of floating member 11.

As pointed out above, a flow friction is produced by the shifting of the floating member 11 in the narrow clearance between the guide rings 23 or the annular collar 25 and the opposite guide surface of insert member 7, which flow friction damps the shifting movements of the floating member 11. For the purposes of the invention it is important that the floating member 11 have at its lower section, i. e. on that portion of its outer surface which lies in every operational position below the lowermost edge of the openings 10 at least a narrow clearance.

With respect to the embodiment shown in Fig. 5, it is of advantage if the guide rings 23 have opposite the guide wall of insert member 7 a bead-like outer surface or a knife-like edge. In this way, the suspended particles carried along the flowing gas which become deposited in the narrow annular clearance space are easily removed by the shifting movements of the floating member 11 within the insert member 7, so that no disturbing mechanical friction can occur. The annular space 24 between guide rings 25 aids in producing the desired movement-damping effect, since in this annular space the laminar flow is transformed at least partly into a turbulent flow.

In the embodiments of the particular floating member 11 shown and described, the cup-shaped floating member may be formed by pressing it out of a thin drawn sheet, the guide rings 22, 23 and 25 being pressed out of the sheet. The floating member can, however, be made, for example, from a turning or a casting, and also out of other suitable materials, such as molded plastics or the like.

It will be understood that each of the elements described above, or two or more together, may also find a useful application in other types of flow control devices differing from the types described above.

While the invention has been illustrated and described as embodied in a flow control device for gas water heaters, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalents of the following claims.

What is claimed as new and desired to be secured by Letters Patent is:

1. A flow control device, comprising, in combination, conduit means having an inlet portion and an outlet portion for passage of a fluid medium therethrough; and a removable flow control unit arranged in said conduit means between said inlet and outlet portions thereof for controlling the flow of fluid medium therethrough, said unit comprising a hollow insert means having a substantially vertical operating position, removably mounted in said conduit means and being formed between its top and bottom ends with openings through which said inlet and outlet portions communicate, a control member having a wall portion substantially normal to the direction of fluid flow movably mounted within said insert means to be moved by the difference between the pressures of the fluid medium in said inlet portion respectively acting on opposite faces of said wall portion toward a position covering said openings in said insert means for reducing the flow of fluid medium therethrough and toward an open position uncovering said openings for increasing the flow of fluid medium therethrough, said control member being biased by its own weight toward said open position, and a cover member forming a portion of the wall of said conduit means and being removably connected thereto, said cover member being secured to said insert means, whereby said flow control unit may be removed from said conduit means by removal of said cover member therefrom.

2. A flow control device, comprising, in combination, conduit means having an inlet portion and an outlet portion for passage of a fluid medium therethrough; and a removable flow control unit arranged in said conduit means between said inlet and outlet portions thereof for controlling the flow of fluid medium therethrough, said unit comprising a tubular insert means having a substantially vertical operating position, removably mounted in said conduit means and being formed between its top and bottom ends with openings through which said inlet and outlet portions communicate and having an annular mounting member extending around its inner surface, a control member having a wall portion substantially normal to the direction of fluid flow movably mounted within said insert means to be moved by the difference between the pressures of the fluid medium in said inlet portion respectively acting on opposite faces of said wall portion toward a position covering said openings in said insert means for reducing the flow of fluid medium therethrough and toward an open position uncovering said openings for increasing the flow of fluid medium therethrough, said control member being biased by its own weight toward said open position, and said control member in its open position being seated on said annular mounting member, and a cover member forming a portion of the wall of said conduit means and being removably connected thereto, said cover member being secured to said insert means, whereby said flow control unit may be removed from said conduit means by removal of said cover member therefrom.

3. A flow control device, comprising, in combination, conduit means having an inlet portion and an outlet portion for passage of a fluid medium therethrough; and a removable flow control unit arranged in said conduit means between said inlet and outlet portions thereof for controlling the flow of fluid medium therethrough, said unit comprising an outer tubular insert means having a substantially vertical operating position, removably mounted in said conduit means and being formed between its top and bottom ends with openings through which said inlet and outlet portions communicate, a cup-shaped control member having a bottom wall portion substantially normal to the direction of fluid flow and formed with an aperture, said control member being movably mounted within said insert means to be moved by the difference between the pressures of the fluid medium in said inlet portion respectively acting on opposite faces of said wall portion toward a position covering said openings in said insert means for reducing the flow of fluid medium therethrough and toward an open position uncovering said openings for increasing the flow of fluid medium therethrough, said control member being biased by its own weight toward said open position, an inner tubular means extending through said insert means, said cup-shaped control member and the aperture in said control member and having openings through which said openings of said insert means communicate with the inlet portion, and a cover member forming a portion of the wall of said conduit means and being removably connected thereto, said cover member being secured to said insert means, whereby said flow control unit may be removed from said conduit means by removal of said cover member therefrom.

4. A flow control device, comprising, in combination, conduit means having an inlet portion and an outlet portion for passage of a fluid medium therethrough; and a removable flow control unit arranged in said conduit means between said inlet and outlet portions thereof for controlling the flow of fluid medium therethrough, said unit comprising an outer tubular insert means having a substantially vertical operating position, removably mounted in said conduit means and being formed between its top and bottom ends with openings through which said inlet and outlet portions communicate, a cup-shaped control member having a bottom wall portion substantially normal to the direction of fluid flow and formed with an aperture, said control member being movably mounted within said insert means to be moved by the difference between the pressures of the fluid medium in said inlet portion respectively acting on opposite faces of said wall portion toward a position covering said openings in said insert means for reducing the flow of fluid medium therethrough and toward an open position uncovering said openings for increasing the flow of fluid medium therethrough, said control member being biased by its own weight toward said open position, an inner tubular means extending through said insert means, said cup-shaped control member and the aperture in said control member and having openings through which said openings of said insert means communicate with the inlet portion, and a cover member forming a portion of the wall of said conduit means and being removably connected thereto, said cover member being secured to said insert means and said inner tubular means, whereby said flow control unit may be removed from said conduit means by removal of said cover member therefrom.

5. A flow control device, comprising, in combination, conduit means having an inlet portion and an outlet portion for passage of a fluid medium therethrough; a removable flow control unit arranged in said conduit means between said inlet and outlet portions thereof for controlling the flow of fluid medium therethrough, said unit comprising an outer tubular insert means having a substantially vertical operating position, removably mounted in said conduit means and being formed with openings through which said inlet and outlet portions communicate, a cup-shaped control member having a bottom wall portion substantially normal to the direction of fluid flow and formed with an aperture, said control member being movably mounted within said insert means to be moved by the difference between the pressures of the fluid medium in said inlet portion respectively acting on opposite faces of said wall portion toward a position covering said openings in said insert means for reducing the flow of fluid medium therethrough and toward an open position uncovering said openings for increasing the flow of fluid medium therethrough, said control member being biased by its own weight toward said open position, and a cover member forming a portion of the wall of said conduit means and being removably connected thereto, said cover member being secured to said insert means, whereby said flow control unit may be removed from said conduit means by removal of said cover member therefrom; and an inner tubular means extending through said insert means, said cup-shaped control member and the aperture in said control member and having openings through which said openings of said insert means communicate with the inlet portion.

6. A flow control device, comprising, in combination, conduit means having an inlet portion and an outlet portion for passage of a fluid medium therethrough; and a removable flow control unit arranged in said conduit means between said inlet and outlet portions thereof for controlling the flow of fluid medium therethrough, said unit comprising an outer tubular insert means having a substantially vertical operating position, removably mounted in said conduit means and being formed between its top and bottom ends with openings through which said inlet and outlet portions communicate, a cup-shaped control member having a bottom wall portion substantially normal to the direction of fluid flow and formed with an aperture, said control member being movably mounted within said insert means to be moved by the difference between the pressures of the fluid medium in said inlet portion respectively acting on opposite faces of said wall portion toward a position covering said openings in said insert means for reducing the flow of fluid medium therethrough and toward an open position uncovering said openings for increasing the flow of fluid medium therethrough, said control member being biased by its own weight toward said open position, an inner tubular means extending through said insert means, said cup-shaped control member and the aperture in said control member and having adjustable openings through which said openings of said insert means communicate with the inlet portion, a cover member forming a portion of the wall of said conduit means and being removably connected thereto, said cover member being secured to said insert means and said inner tubular means, and adjusting means connected to said inner tubular means and extending outwardly through said cover member for adjusting the size of the openings in said inner tubular means, whereby said flow control unit may be removed from said conduit means by removal of said cover member therefrom.

7. A flow control device, comprising, in combination, conduit means having an inlet portion and an outlet portion for passage of a fluid medium therethrough; and a removable flow control unit arranged in said conduit means between said inlet and outlet portions thereof for controlling the flow of fluid medium therethrough, said unit comprising an outer tubular insert means having a substantially vertical operating position, removably mounted in said conduit means and being formed between its top and bottom ends with openings through which said inlet and outlet portions communicate, a cup-shaped control member having a bottom wall portion substantially normal to the direction of fluid flow and formed with an aperture, said control member being movably mounted within said insert means to be moved by the difference between the pressures of the fluid medium in said inlet portion respectively acting on opposite faces of said wall portion toward a position covering said openings in said insert means for reducing the flow of fluid medium therethrough and toward an open position uncovering said openings for increasing the flow of fluid medium therethrough, said control member being biased by its own weight toward said open position, an inner tubular means extending through said insert means, said cup-shaped control member and the aperture in said control member and having adjustable openings through which said openings of said insert means communicate with the inlet portion, a cover member formed with an aperture and forming a portion of the wall of said conduit means and being removably connected thereto, said cover member being secured to said insert means and said inner tubular means, and adjusting means including a pin member connected to said inner tubular means and extending outwardly through said aperture in said cover member for adjusting the size of the openings in said inner tubular means, said pin member having a sealing ring located between itself and the wall of the aperture in said cover member, said sealing ring serving to hold said adjusting means in adjusted position, whereby said flow control unit may be removed from said conduit means by removal of said cover member therefrom.

8. A flow control device, comprising, in combination, conduit means having an inlet portion and an outlet portion for passage of a fluid medium therethrough; and a removable flow control unit arranged in said conduit means between said inlet and outlet portions thereof for controlling the flow of fluid medium therethrough, said unit comprising an outer tubular insert means having a substantially vertical operating position, removably mounted in said conduit means and being formed between its top and bottom ends with openings through which said inlet and outlet portions communicate, a cup-shaped control member having a bottom wall portion substantially normal to the direction of fluid flow and formed with an aperture, said control member being movably mounted within said insert means to be moved by the difference between the pressures of the fluid medium in said inlet portion respectively acting on opposite faces of said wall portion toward a position covering said openings in said insert means for reducing the flow of fluid medium therethrough and toward an open position uncovering said openings for increasing the flow of fluid medium therethrough, said control member being biased by its own weight toward said open position, an inner tubular means extending through said insert means, said cup-shaped control member and the aperture in said control member and having openings through which said openings of said insert means communicate with the inlet portion, said inner tubular means including an annular apertured member arranged adjacent said openings therein and turnable about the axis of said inner tubular means for covering and uncovering said openings therein, and a cover member forming a portion of the wall of said conduit means and being removably connected thereto, said cover member being secured to said insert means and said inner tubular means, whereby said flow control unit may be removed from said conduit means by removal of said cover member therefrom.

9. A flow control device, comprising, in combination, conduit means having an inlet portion and an outlet portion for passage of a fluid medium therethrough; and a removable flow control unit arranged in said conduit means between said inlet and outlet portions thereof for controlling the flow of fluid medium therethrough, said unit comprising an outer tubular insert means having a substantially vertical operating position, removably mounted in said conduit means and being formed between its top and bottom ends with openings through which said inlet and outlet portions communicate, a cup-shaped control member having a bottom wall portion substantially normal to the direction of fluid flow and formed with an aperture, said control member being movably mounted within said insert means to be moved by the difference between the pressures of the fluid medium in said inlet portion respectively acting on opposite faces of said wall portion toward a position covering said openings in said insert means for reducing the flow of fluid medium therethrough and toward an open position uncovering said openings for increasing the flow of fluid medium therethrough, said control member being biased by its own weight toward said open position, an inner tubular means extending through said insert means, said cup-shaped control member and the aperture in said control member and having openings through which said openings of said insert means communicate with the inlet portion, said inner tubular means including an annular apertured member arranged adjacent said openings therein and turnable about the axis of said inner tubular means for covering and uncovering said openings therein, the cross section of said openings in said inner tubular means in fully uncovered condition being at least equal to the cross section of said inner tubular means, and a cover member forming a portion of the wall of said conduit means and being removably connected thereto, said cover member being secured to said insert means and said inner tubular means, whereby said flow control unit may be removed from said conduit means by removal of said cover member therefrom.

10. A flow control device, comprising, in combination, conduit means having an inlet portion and an outlet portion for passage of a fluid medium therethrough; and a removable flow control unit arranged in said conduit means between said inlet and outlet portions thereof for controlling the flow of fluid medium therethrough, said unit comprising a hollow insert means having a substantially vertical operating position, removably mounted in said conduit means and being formed between its top and bottom ends with openings through which said inlet and outlet portions communicate, a control member having a wall portion substantially normal to the direction of fluid flow movably mounted within said insert means to be moved by the difference between the pressures of the fluid medium in said inlet portion respectively acting on opposite faces of said wall portion toward a position covering said openings in said insert means for reducing the flow of fluid medium therethrough and movable toward an open position uncovering said openings for increasing the flow of fluid medium therethrough, said control member being biased by its own weight toward said open position, a cover member forming a portion of the wall of said conduit means and being removably connected thereto, said cover member being secured to said insert means, and a screen member in the inlet portion of said conduit means removably mounted on said insert means, whereby said flow control unit may be removed from said conduit means by removal of said cover member therefrom.

11. A flow control device, comprising, in combination, conduit means having an inlet portion and an outlet portion for passage of a fluid medium therethrough; and a removable flow control unit arranged in said conduit means between said inlet and outlet portions thereof for controlling the flow of fluid medium therethrough, said unit comprising a tubular insert means having a substantially vertical operating position, removably mounted in said conduit means and being formed between its top and bottom ends with openings through which said inlet and outlet portions communicate, a control member having a wall portion substantially normal to the direction of fluid flow movably mounted within said insert means to be moved by the difference between the pressures of the fluid medium in said inlet portion respectively acting on opposite faces of said wall portion toward a position covering said openings in said insert means for reducing the flow of fluid medium therethrough and movable toward an open position uncovering said openings for increasing the flow of fluid medium therethrough, said control member being biased by its own weight toward said open position, a cover member forming a portion of the wall of said conduit means and being removably connected thereto, said cover member being secured to said insert means, a sealing ring arranged between and engaging adjacent ends of said inlet portion and said tubular insert means, and a conical screen member in said inlet portion extending with its base into and engaging the end of said tubular insert means and bearing against said sealing ring for centering the same, whereby said flow control unit may be removed from said conduit means by removal of said cover member therefrom.

12. A flow control device, comprising, in combination, conduit means having an inlet portion and an outlet portion for passage of a fluid medium therethrough; a removable flow control unit arranged in said conduit means between said inlet and outlet portions thereof for controlling the flow of fluid medium therethrough, said unit comprising an outer tubular insert means having a substantially vertical operating position, removably mounted in said conduit means and being formed between its top and bottom ends with openings through which said inlet and outlet portions communicate, a cup-shaped control member having a bottom wall portion substantially normal to the direction of fluid flow and formed with an aperture, said control member being movably mounted within said insert means to be moved by the difference between the pressures of the fluid medium in said inlet portion respectively acting on opposite faces of said wall portion toward a position covering said openings in said insert means for reducing the flow of fluid medium therethrough and toward an open position uncovering said openings for increasing the flow of fluid medium therethrough, said control member being biased by its own weight toward said open position, and a cover member forming a portion of the wall of said conduit means and being removably connected thereto, said cover member being secured to said insert means, whereby said flow control unit may be removed from said conduit means by removal of said cover member therefrom; and an inner tubular means extending through said insert means, said cup-shaped control member and the aperture in said control member and having openings through which openings of said insert means communicate with the inlet portion, said inner tubular means being arranged in said conduit means with an open end thereof adjacent said removable cover member and being mounted at its other end in the wall of said conduit means for adjustable axial movement for varying the spacing of its open end from the inner surface of said cover member, to thereby adjust the flow of fluid medium out through its open end into said outlet portion.

13. A flow control device, comprising, in combination, conduit means having an inlet portion and an outlet portion for passage of a fluid medium therethrough; a removable flow control unit arranged in said conduit means between said inlet and outlet portions thereof for controlling the flow of fluid medium therethrough, said unit comprising an outer tubular insert means having a substantially vertical operating position, removably mounted in said conduit means and being formed between its top and bottom ends with openings through which said inlet and outlet portions communicate, a cup-shaped control member having a bottom wall portion substantially normal to the direction of fluid flow and formed with an aperture, said control member being movably mounted within said insert means to be moved by the difference between the pressures of the fluid medium in said inlet portion respectively acting on opposite faces of said wall portion toward a position covering said openings in said insert means for reducing the flow of fluid medium therethrough and toward an open position uncovering said openings for increasing the flow of fluid medium therethrough, said control member being biased by its own weight toward said open position, and a cover member forming a portion of the wall of said conduit means and being removably connected thereto, said cover member being secured to said insert means, whereby said flow control unit may be removed from said conduit means by removal of said cover member therefrom; an inner tubular means extending through said insert means, said cup-shaped control member and the aperture in said control member and having openings through which said openings of said insert means communicate with the inlet portion, said inner tubular means being arranged in said conduit means with an open end thereof adjacent said removable cover member and being mounted at its other end in the wall of said conduit means for adjustable axial movement; and adjustable screw means extending through said conduit means and connected to said other end of said inner tubular means, said adjustable screw means being turnable to axially move said inner tubular means for varying the spacing of the open end of said inner tubular means from the inner surface of said cover member, to thereby adjust the flow of fluid medium out through its open end into said outlet portion.

14. A flow control device, comprising, in combination, conduit means having an inlet portion and an outlet portion for passage of a fluid medium therethrough, said inlet and outlet portions being arranged at an angle relative to each other; and a removable flow control unit arranged in said conduit means between said inlet and outlet portions thereof for controlling the flow of fluid medium therethrough, said unit comprising a hollow insert means having a substantially vertical operating position, removably mounted in said conduit means and being formed between its top and bottom ends with openings through which said inlet and outlet portions communicate, a control member having a wall portion substantially normal to the direction of fluid flow movably mounted within said insert means to be moved by the difference between the pressures of the fluid medium in said inlet portion respectively acting on opposite faces of said wall portion toward a position covering said openings in said insert means for reducing the flow of fluid medium therethrough and toward an open position uncovering said openings for increasing the flow of fluid medium therethrough, said control member being biased by its own weight toward said open position, and a cover member forming a portion of the wall of said conduit means and being removably connected thereto, said cover member being secured to said insert means, whereby said flow control unit may be removed from said conduit means by removal of said cover member therefrom.

15. A flow control device, comprising, in combination, conduit means having an inlet portion and an outlet portion for passage of a fluid medium therethrough, said inlet and outlet portions extending in substantially the same direction; and a removable flow control unit arranged in said conduit means between said inlet and outlet portions thereof for controlling the flow of fluid medium therethrough, said unit comprising a hollow insert means having a substantially vertical operating position, removably mounted in said conduit means and being formed between its top and bottom ends with openings through which said inlet and outlet portions communicate, a control member having a wall portion substantially normal to the direction of fluid flow movably mounted within said insert means to be moved by the difference between the pressures of the fluid medium in said inlet portion toward a position covering said openings in said insert means for reducing the flow of fluid medium therethrough and toward an open position uncovering said openings for increasing the flow of fluid medium therethrough, said control member being biased by its own weight toward said open position, and a cover member forming a portion of the wall of said conduit means and being removably connected thereto, said cover member being secured to said insert means, whereby said flow control unit may be removed from said conduit means by removal of said cover member therefrom.

16. A flow control device, comprising, in combination, conduit means having an inlet portion and an outlet portion for passage of a fluid medium therethrough; and a removable flow control unit arranged in said conduit means between said inlet and outlet portions thereof for controlling the flow of fluid medium therethrough, said unit comprising a tubular insert means having a substantially vertical operating position, removably mounted in said conduit means and being formed between its top and bottom ends with openings through which said inlet and outlet portions communicate and having an annular mounting member extending around its inner surface, a cup-shaped control member having a bottom wall portion substantially normal to the direction of fluid flow and formed with an aperture, said control member being movably mounted within said insert means to be moved by the difference between the pressures of the fluid medium in said inlet portion respectively acting on opposite faces of said wall portion toward a position covering said openings in said insert means for reducing the flow of fluid medium therethrough and toward an open position uncovering said openings for increasing the flow of fluid medium therethrough, said control member being biased by its own weight toward said open position, and said control member in its open position being seated on said annular mounting member, an inner tubular means extending through said insert means, said cup-shaped control member and the aperture in said control member and having openings through which said openings of said insert means communicate with the inlet portion, and a cover member forming a portion of the wall of said conduit means and being removably connected thereto, said cover member being secured to said insert means and said inner tubular means, whereby said flow control unit may be removed from said conduit means by removal of said cover member therefrom.

17. A flow control unit adapted to be mounted in a conduit between inlet and outlet portions thereof, comprising, in combination, a hollow insert means having a substantially vertical operating position, adapted to be removably mounted in the conduit and being formed between its top and bottom ends with openings through which the inlet and outlet portions of the conduit are adapted to communicate; a control member having a wall portion substantially normal to the direction of fluid flow movably mounted within said insert means to be moved by the difference between the pressures of fluid medium in the inlet portion respectively acting on opposite faces of said wall portion toward a position covering the openings in said insert means for reducing the flow of fluid medium therethrough and toward an open position uncovering said openings for increasing the flow of fluid medium therethrough, said control member being biased by its own weight toward said open position; and a cover member secured to said insert means and adapted to be removably connected to the conduit so as to form a portion of the wall thereof, whereby the flow control unit may be removed from the conduit by removal of said cover member therefrom.

18. A flow control unit adapted to be mounted in a conduit between inlet and outlet portions thereof, comprising, in combination, an outer tubular insert means having a substantially vertical operating position, adapted to be removably mounted in the conduit and being formed between its top and bottom ends with openings through which the inlet and outlet portions of the conduit are adapted to communicate; a cup-shaped control member having a bottom wall portion substantially normal to the direction of fluid flow and formed with an aperture, said control member being movably mounted within said insert means to be moved by the difference between the pressures of fluid medium in the inlet portion respectively acting on opposite faces of said wall portion toward a position covering the openings in said insert means for reducing the flow of fluid medium therethrough and toward an open position uncovering said openings for increasing the flow of fluid medium therethrough, said control member being biased by its own weight toward said open position; an inner tubular means extending through said insert means, said cup-shaped control member and the aperture in said control member, and having openings through which the openings of said insert means communicate with the inlet portion of the conduit; and a cover member secured to said insert means and said inner tubular means and adapted to be removably connected to the conduit so as to form a portion of the wall thereof, whereby the flow control unit may be removed from the conduit by removal of said cover member therefrom.

19. A flow control unit adapted to be mounted in a conduit between inlet and outlet portions thereof, comprising, in combination, an outer tubular insert means having a substantially vertical operating position, adapted to be removably mounted in the conduit and being formed between its top and bottom ends with openings through which the inlet and outlet portions of the conduit are adapted to communicate; a cup-shaped control member having a bottom wall portion substantially normal to the direction of fluid flow and formed with an aperture, said control member being movably mounted within said insert means to be moved by the difference between the pressures of fluid medium in the inlet portion respectively acting on opposite faces of said wall portion toward a position covering the openings in said insert means for reducing the flow of fluid medium therethrough and toward an open position uncovering said openings for increasing the flow of fluid medium therethrough, said control member being biased by its own weight toward said open position; an inner tubular means extending through said insert means, said cup-shaped control member and the aperture in said control member and having adjustable openings through which the openings of said insert means communicate with the inlet portion of the conduit; a cover member secured to said insert means and said inner tubular means and adapted to be removably connected to the conduit so as to form a portion of the wall thereof; and adjusting means connected to said inner tubular means and extending through said cover member for adjusting the size of the openings in said inner tubular means, whereby the flow control unit may be removed from the conduit by removal of said cover member therefrom.

References Cited in the file of this patent
UNITED STATES PATENTS

| | | |
|---|---|---|
| 2,198,487 | Sisk | Apr. 23, 1940 |
| 2,584,418 | Branson | Feb. 5, 1952 |